(12) United States Patent
Metral et al.

(10) Patent No.: US 9,130,418 B2
(45) Date of Patent: Sep. 8, 2015

(54) DIRECT CURRENT ROTATING ELECTRIC MACHINE WITH STATOR HAVING MAGNETISED STRUCTURE

(75) Inventors: Jean Sébastien Metral, La Verpillière (FR); Nicolas Labbe, Lyons (FR); Benoit Dupeux, Oyeu (FR); Stéphane Plaideau, Lyons (FR)

(73) Assignee: Valeo Equipements Electriques Moteur, Créteil Cedex (FR)

( * ) Notice: Subject to any disclaimer, the term of this patent is extended or adjusted under 35 U.S.C. 154(b) by 724 days.

(21) Appl. No.: 12/515,470

(22) PCT Filed: Nov. 30, 2007

(86) PCT No.: PCT/FR2007/052424
§ 371 (c)(1),
(2), (4) Date: Dec. 22, 2009

(87) PCT Pub. No.: WO2008/074954
PCT Pub. Date: Jun. 26, 2008

(65) Prior Publication Data
US 2010/0127590 A1 May 27, 2010

(30) Foreign Application Priority Data

Dec. 15, 2006 (FR) .................................. 06 55537
Dec. 15, 2006 (FR) .................................. 06 55548
Dec. 15, 2006 (FR) .................................. 06 55552
Aug. 22, 2007 (FR) .................................. 07 57122

(51) Int. Cl.
*H02K 1/17* (2006.01)
*H02K 23/04* (2006.01)
*H02K 15/03* (2006.01)

(52) U.S. Cl.
CPC .................. *H02K 1/17* (2013.01); *H02K 23/04* (2013.01); *H02K 15/03* (2013.01)

(58) Field of Classification Search
CPC ......... H02K 1/17; H02K 21/26; H02K 21/28; H02K 21/30

USPC ............. 310/154.21, 154.22, 154.23, 154.24, 310/154.25, 154.28, 154.29
IPC ......................... H02K 1/17,21/26, 21/28, 21/30
See application file for complete search history.

(56) References Cited

U.S. PATENT DOCUMENTS 6,628,030 B2 * 9/2003 Harada et al. ............ 310/154.28
6,858,962 B2 * 2/2005 Post .............................. 310/191
(Continued)

FOREIGN PATENT DOCUMENTS

DE          3730615 A   *  3/1989
DE        39 13276 A1     10/1990
(Continued)

OTHER PUBLICATIONS

Machine translation (abstract) of DE 3730615 A, published Mar. 30, 1989 (translated Jun. 19, 2012).*
(Continued)

*Primary Examiner* — Michael Andrews
(74) *Attorney, Agent, or Firm* — Berenato & White, LLC

(57) ABSTRACT

A DC electric rotating machine mainly for the starter of an automotive vehicle, including: a stator having a magnetized structure with permanent magnetization and extending along the circumference of the stator; a rotor; a set of brushes adapted for the electric supply of the rotor by switching the electrical current in sections of the rotor; wherein the magnetized structure (5) of the stator includes at least one sector, between two consecutive magnetic poles (N; S) of the magnetized structure, having a magnetization vector that varies in an essentially sinusoidal manner upon displacement on the stator circumference, and wherein the angular deviation of the neutral line is selected so as to improve the switching during the operation of the machine.

17 Claims, 14 Drawing Sheets

(56) References Cited

U.S. PATENT DOCUMENTS

| | | | |
|---|---|---|---|
| 7,265,470 B1* | 9/2007 | Paden et al. | 310/156.43 |
| 2006/0113857 A1* | 6/2006 | Honkura et al. | 310/156.43 |
| 2006/0158054 A1 | 7/2006 | Akabane | |
| 2006/0186751 A1* | 8/2006 | Kim et al. | 310/156.44 |
| 2006/0238058 A1* | 10/2006 | Koide et al. | 310/156.55 |

FOREIGN PATENT DOCUMENTS

| | | |
|---|---|---|
| EP | 1 035 629 A2 | 9/2000 |
| EP | 1 211 778 A2 | 6/2002 |
| FR | 2 691 592 A1 | 11/1993 |
| JP | 2002 095230 A | 3/2002 |
| JP | 2004 023915 A | 1/2004 |

OTHER PUBLICATIONS

Zhu et al., "Novel permanent magent machines using halbach cylinders," Power Electronics and Motion Control Conference, 2000. vol. 2, Aug. 15, 2000, pp. 903-908.

* cited by examiner

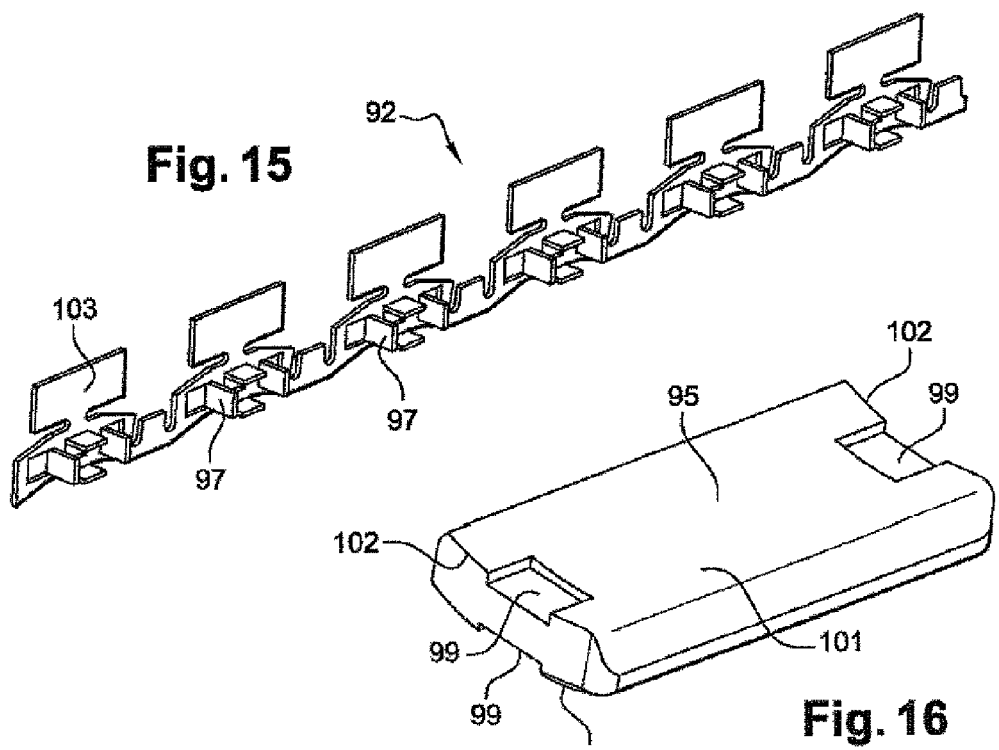
Fig. 15
Fig. 16
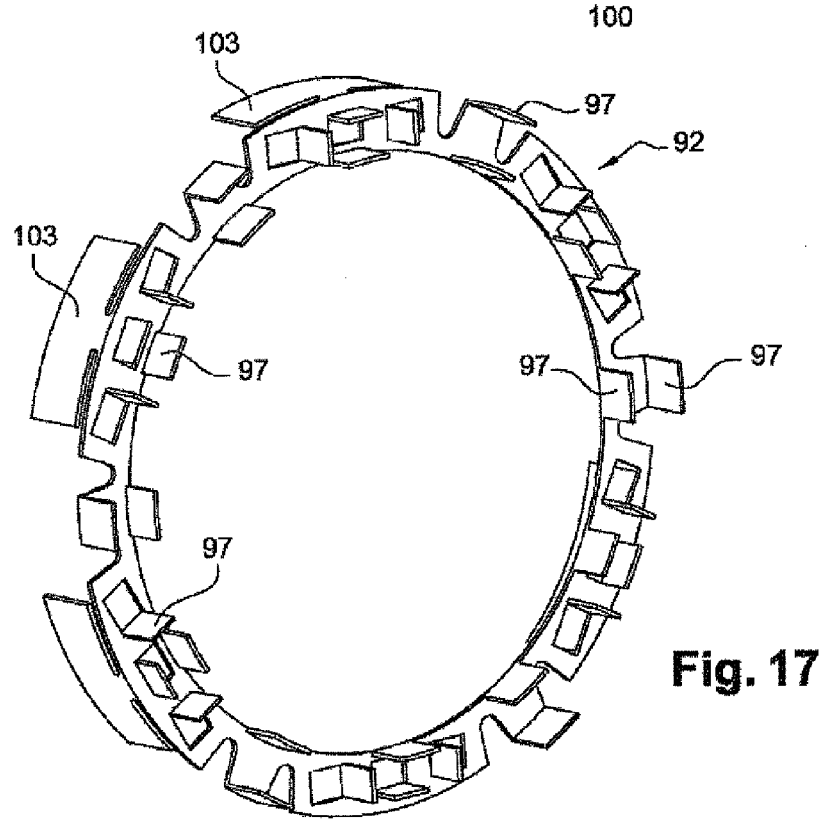
Fig. 17

US 9,130,418 B2

DIRECT CURRENT ROTATING ELECTRIC MACHINE WITH STATOR HAVING MAGNETISED STRUCTURE

CROSS-REFERENCE TO RELATED APPLICATIONS AND CLAIM TO PRIORITY

This application relates to International Application No. PCT/FR2007/052424 filed Nov. 30, 2007, French Patent Application No. 0655537 filed Dec. 15, 2006, French Patent Application No. 0655548 filed Dec. 15, 2006, French Patent Application No. 0655552 filed Dec. 15, 2006 and French Patent Application No. 0757122 filed Aug. 22, 2007, of which the disclosures are incorporated herein by reference and to which priority is claimed.

BACKGROUND OF THE INVENTION

1. Field of the Invention

The present invention relates notably to a rotating electrical machine, in particular for an automotive vehicle starter.

2. Description of Related Art

The patent EP-B1-985 334 describes a starter including a stator having a plurality of magnetic poles disposed on a circumferential internal surface of a yoke. Each magnetic pole is formed by a ferrite permanent magnet that is magnetised so that the north and south poles are radially oriented. Auxiliary magnets can be provided between the aforementioned magnets. These auxiliary magnets are of ferrite and magnetised so that the north and south poles are circumferentially oriented. A space is provided between each auxiliary magnet and the yoke. Such a disposition reduces magnetic leaks.

It has been found that a strong armature magnetic reaction in a DC electrical machine with brushes, in particular in a starter having a high magnetomotive force (mmf) at very low voltages and a usable power greater than 1 kW, can lead to a reduction in the performance of the machine. In some cases, an angular offset of the brushes and/or a compensation winding or switching assistance winding are used to alleviate the effects of the armature reaction. The angular offset of the brushes is optimal only for a predetermined electric current. Also, the aforementioned winding is generally bulky.

There is also known from the paper entitled 'The application of Halbach cylinders to brushless AC servo motors', K. Atallah and D. Howe, IEEE Transactions On Magnetics, Vol. 34, No. 4, July 1998, a brushless machine in which the variation of the induction relative to the electrical angle in the airgap is sinusoidal. The paper 'New concept of permanent magnet excitation for electrical machines. Analytical and numerical computation', M. Marinescu and N. Marinescu, IEEE Transactions On Magnetics, Vol. 28, No. 2, March 1992, concerns magnetisation in a slotless type machine, the magnetic excitation being either on the rotor or on the stator of the machine.

It is known, in an automotive vehicle starter, to produce a stator, or armature, by gluing permanent magnets to a yoke of the stator. In some cases it can prove difficult to glue on permanent magnets. It is also known to fix permanent magnets to the yoke using clips, each adapted for only one permanent magnet. The patent application EP 1 035 629 and U.S. Pat. No. 6,465,925 describe examples of clips for holding auxiliary magnets between main magnets. U.S. Pat. No. 4,707,630 teaches holding permanent magnets against a yoke using a cylinder made from sheet steel bearing against an interior circumference of the permanent magnets.

SUMMARY OF THE INVENTION

One object of the invention is to reduce the effects of the armature magnetic reaction.

Another object of the invention is to facilitate fixing magnets to a starter stator.

One aspect of the invention consists in a direct current rotating electrical machine, notably for an automotive vehicle starter, the machine including:
- a stator, or field assembly, including a magnetised structure with permanent magnetisation, extending around a circumference of the stator,
- a rotor, or armature,
- a group of brushes adapted to supply electrical power to the rotor by switching the electrical current in sections of the rotor, the machine being characterised in that the magnetised structure of the stator includes at least one sector having a magnetisation direction different from the radial and orthoradial directions of the stator.

The invention as defined hereinabove notably produces the magnetised structure with two or more angular transitions between two consecutive magnetic poles of the machine. The magnetisation direction can thus vary in a relatively progressive manner around the circumference of the magnetised structure.

The applicant has unexpectedly found that such a magnetised structure can increase the torque and the power per unit mass of the machine, and reduce, or even substantially eliminate, the displacement of the neutral magnetic line when the armature current increases, and therefore substantially eliminate these effects. The neutral magnetic line is defined as the location at which the induction cancels out between two consecutive field magnet poles.

Accordingly, thanks to the invention, it is possible to dispense with a compensation winding and/or switching assistance winding or angular offsetting of the brushes.

The invention further improves switching, limits wear of the brushes and limits vibro-acoustic radiation from the machine.

The angular transitions further improve the mechanical stability of the permanent magnets in the magnetised structure.

Although the above papers by Attallah et al. and Marinescu et al. describe magnetisation with a plurality of angular transitions between magnetic poles, their teaching is limited to machines in which the variation of the induction relative to the electrical angle is ideally sinusoidal.

Now, in a machine of the type with brushes, it is generally accepted that the variation of the induction relative to the electric angle must approximate a trapezoidal shape with a wide plateau, so that the induction is maximal over the widest possible angular range.

Consequently, according to the received wisdom in the art, which is refuted by the invention, the teachings of the above papers by Attallah et al. and Marinescu et al. are not suited to a machine of the type with brushes.

The sector with a magnetisation direction different from the radial and orthoradial directions preferably subtends an electrical angle greater than 10°, notably 20°, even 30° or 40°.

The electrical angle corresponds to an angle measured in the machine, also known as the mechanical angle, multiplied by the number of pairs of poles of the machine, which amounts to considering any machine as a juxtaposition within the same set of a plurality of individual machines each with only one pair of poles.

The magnetisation direction, in the sector with a magnetisation direction different from the radial and orthoradial directions, advantageously forms with the orthoradial direction of the stator an angle between 5° and 85°, for example, notably between 10° and 80°, even between 20° and 70° or between 30° and 60°.

In one embodiment of the invention, the magnetisation within the magnetised structure has a direction non-parallel to itself over one circuit of the stator.

If required, the magnetisation direction within the magnetised structure, relative to a radial direction, varies with no angular discontinuity greater than 90°, in particular with no angular discontinuity greater than or equal to 45°, around the circumference of the stator.

The magnetised structure of the stator can be disposed against a yoke and have a magnetisation chosen so that the magnetic field generated by the magnetic structure outside the latter structure, measured in the absence of the yoke, is weaker than the field generated inside the magnetised structure, the magnetic energy outside the magnetised structure being notably less than 30% or 20% of the magnetic energy inside the structure, the magnetic energy outside the structure, measured in the absence of the yoke, being notably substantially zero.

Between two consecutive magnetic poles of the magnetised structure, the angle between the magnetisation direction of the structure and a radial direction of the stator advantageously varies monotonously, i.e. this angle always increases or decreases on moving from any one magnetic pole to the next pole.

This notably concentrates the magnetic energy toward the airgap of the machine.

In one embodiment of the invention, the magnetised structure of the stator includes a plurality of permanent magnets, at least one of the magnets having, in a central region around a circumference of the stator, a magnetisation direction different from the radial and orthoradial directions.

For example, the magnetised structure of the stator can include a plurality of permanent magnets, at least one of the permanent magnets having at all points a magnetisation direction different from the radial and orthoradial directions.

If required, this permanent magnet has a magnetisation direction that is substantially parallel to itself at any point in the magnet.

In one embodiment of the invention, the magnetised structure of the stator includes at least two permanent magnets defining two consecutive magnetic poles of the magnetised structure and this structure further includes two permanent magnets disposed between said two magnets defining the poles.

If necessary, the magnetised structure can have a thickness, measured in a radial direction of the magnetised structure, that is substantially constant on moving circumferentially from any one magnetic pole of the structure to the next pole.

Alternatively, the magnetised structure can have a thickness that varies on moving circumferentially from any one magnetic pole of the structure to the next pole.

The magnetised structure can include permanent magnets of different thicknesses, for example.

In one embodiment of the invention, the magnetised structure has no interrupted area having an electrical angle aperture greater than 1°, notably 2° or 5°. The interrupted area corresponds, for example, to the presence of a tongue of a support of the magnetised structure inserted into a radial slot of that structure. This tongue defines an airgap between two permanent magnets of the magnetised structure.

In one embodiment of the invention, the orientation of the magnetisation direction within the magnetised structure varies, between two consecutive magnetic poles, substantially discontinuously or, alternatively, continuously.

The machine of the invention can be of the two-pole or four-pole type, or preferably of the type with six poles or more.

The magnetised structure can include a number of permanent magnets strictly greater than the number of poles of the machine, notably greater than or equal to twice the number of poles.

For example, the machine can be of the six-pole type and the magnetised structure include 24 permanent magnets.

Alternatively, the magnetised structure includes a number of permanent magnets less than or equal to the number of poles of the machine, being notably equal to half the number of poles.

For example, the machine can be of the six-pole type and the magnetised structure include three permanent magnets each subtending an angle of substantially 120°.

If necessary, the magnetised structure includes at least one permanent magnet based on NdFeB, notably a sintered magnet of this type. Alternatively, the magnetised structure includes at least one ferrite magnet.

The invention also consists in a direct current rotating electrical machine, notably for an automotive vehicle starter, the machine including:
 a stator including a magnetised structure with permanent magnetisation, extending around a circumference of the stator,
 a rotor,
 a group of brushes adapted to supply electrical power to the rotor by switching the electrical current in sections of the rotor,
 the machine being characterised in that the magnetised structure of the stator includes at least one sector, between two consecutive magnetic poles of that structure, having a magnetisation vector varying substantially sinusoidally around the circumference of the stator.

The sinusoidal shape of the magnetisation reduces the sensitivity to the armature reaction and, where applicable, increases the torque developed by the machine.

The angular offset of the neutral line is advantageously chosen to improve switching when the machine is operating by active acceleration of the current in the rotor during reversal thereof.

The production of the angular offset, which is optionally relatively large, can be controlled better, notably compared to the case of magnetisation in a radial direction, because this angular offset is effected according to a substantially linear or locally linear induction law.

In one embodiment of the invention, the angular offset of the neutral line can notably be greater than 15 electrical degrees, even 20 electrical degrees.

The magnetisation vector within the magnetised structure can, if required, vary substantially sinusoidally over the whole of the circumference of that structure.

Alternatively, the magnetised structure includes at least one sector having a magnetisation vector varying non-sinusoidally, for example with a radial direction in the sector, this sector notably subtending an electrical angle greater than 10°, notably 20°.

Where appropriate, the machine forms an automotive vehicle starter having a high armature reaction.

The electrical machine can include a speed reducer.

Thanks to an increase in torque, the invention reduces the rotation speed of the collector of the machine for the same torque operating point, which ensures a longer switching time and consequently a reduction of the losses and wear of the brushes and the collector by electrical arcing (sparks).

Furthermore, and again thanks to the invention, because of the reduction of the amplitude of the electrical arcing, through improved switching, it is possible to limit conducted and radiated electromagnetic interference, which is particularly advantageous with regard to the electromagnetic compatibility (EMC) of electrical and electronic equipment (onboard a vehicle or not) with the electrical machine.

A further aspect of the invention, independent of or in combination with the above aspect, is a rotating electrical machine, notably for automotive vehicle starter, of the type with N magnetic poles (N being an integer), including a stator, or field assembly, including:

a plurality of permanent magnets, the number of magnets being strictly greater than the number N of poles of the machine, at least one support carrying, fastened to it, the permanent magnets.

Thanks to the invention, a plurality of magnets can be attached to the support before fixing the resulting assembly to the rest of the machine. It is thus possible to produce beforehand a solid assembly formed by the support and the permanent magnets and then to mount this assembly against the yoke of the stator. Thus the manufacture of the electrical machine can be simplified.

Moreover, if required, the invention enables disposition on the support of permanent magnets substantially adjacent two by two. The permanent magnets can be in contact two by two, with no gap between them. Alternatively, a small gap, or airgap is formed between two consecutive magnets.

In one embodiment of the invention, the support is arranged to hold the permanent magnets at one of their axial ends at least, for example at both their opposite axial ends.

For example, the support includes a plurality of lugs arranged to hold the magnets at one of their axial ends at least.

At least one of the lugs of the support can notably be folded, for example bent, over the permanent magnet, to retain the latter.

In one embodiment of the invention, the support is produced in one piece.

Alternatively, the support includes at least two separate parts, at least one of which is notably disposed at one of the axial ends of the permanent magnets.

The support can, if required, be deformable, notably so as to be rolled up, and arranged to enable placing of the magnets on the support when flat, before rolling it up.

For example, the support includes a plurality of parallel branches extending notably perpendicularly to a circumference of the support, each branch having at its two opposite ends lugs for retaining the permanent magnets. These lugs do not have to be folded over the magnets to retain them. The support can have portions of reduced width forming hinges. These hinge portions facilitate rolling up the support once the magnets have been placed on the support.

This support can have cut-outs leaving the exterior face of the magnets partially uncovered.

In another embodiment of the invention, the support is preformed to have an annular or cylindrical shape before fitting the permanent magnets.

The support can include a plurality of tongues, each interleaved between two consecutive permanent magnets, for retaining them correctly both radially and circumferentially. A small airgap is then formed between two consecutive magnets.

For example, the support is made at least in part of sheet metal, for example by bending the sheet. The support can for example take the form of a metal strip folded from flat to impart an annular shape to it. This approach avoids wastage of material, for example through cutting. Alternatively, the support can be produced by cutting and pressing sheet metal.

If the support includes a cylindrical wall extending along an axial direction of the stator and against which the permanent magnets come to bear, this cylindrical wall, for example of sheet metal, can serve as a hoop for the passage of the magnetic flux and, if necessary, enable the thickness of the yoke to be reduced.

In one embodiment of the invention, at least one of the permanent magnets has an orthoradial magnetisation direction.

At least one of the magnets can have a magnetisation direction different from the radial and orthoradial directions of the stator. If required, the support carries a plurality of main magnets with a radial magnetisation direction and a plurality of auxiliary magnets each disposed between two consecutive main magnets and having an orthoradial magnetisation direction. The auxiliary magnets can for example have a thickness measured in a radial direction of the stator that is smaller than that of the main magnets. These auxiliary magnets are for example separated from the yoke by a gap substantially corresponding to the difference in thickness between the main magnets and the auxiliary magnets.

A further object of the invention is the method for producing a rotating electrical machine as defined hereinabove, including steps consisting of fitting a plurality of permanent magnets to a common support and then attaching the resulting assembly against a yoke of the stator.

The method can where appropriate include the steps of first rolling up the support and then fitting the permanent magnets to the rolled up support.

Alternatively, the method can include the steps of placing the permanent magnets on the support when flat and then rolling up the support.

If the support includes magnet-retaining lugs, these lugs can be folded over the magnets after the latter are placed on the support.

Alternatively, the lugs of the support are folded beforehand, before placing the permanent magnets on the support, these magnets being for example clipped to the support by elastically deforming the lugs.

The support is buttoned into the yoke of the stator, for example, but any other manner of fixing the support to the yoke can be used.

A further object of the invention, independently of or in combination with the above object, is a rotating electrical machine including a stator including at least one permanent magnet and at least one permanent magnet support, the machine being characterised in that the support of the magnet includes at least one lug and the magnet includes at least one recessed or upstanding fixing portion adapted to cooperate with the lug of the support when the magnet is placed on the support.

The lugs of the support notably hold the magnets radially onto the support and, where appropriate, also circumferentially.

Producing a recessed fixing portion on the magnet notably enables it to receive the lug of the support, which avoids the undesirable presence of radial protuberances that can impede the correct mounting of the rotor in the stator.

The electrical machine includes a rotor and said at least one permanent magnet has interior and exterior faces, the interior face facing the rotor, the fixing portion of the magnet being notably produced, notably entirely, on one of the interior and exterior faces of the magnet.

In one embodiment of the invention, the permanent magnet includes recessed or upstanding fixing portions both on the interior face and on the exterior face.

If required, the fixing portion is formed by a notch produced on a face of the magnet.

The notch opens onto an axial edge of the magnet, for example.

This notch can have a substantially rectangular shape. Alternatively, the notch can have any other shape, for example a substantially trapezoidal shape or a substantially circular arc shape.

The lug of the support advantageously has a shape substantially espousing that of the notch, the lug being notably substantially rectangular.

If necessary, the fixing portion includes a bead projecting on one face of the magnet and the lug of the support can be arranged to cooperate with this bead to hold the magnet onto the support.

In one embodiment of the invention, recessed or upstanding fixing portions are produced on only one face of the magnet, notably an interior face.

If required, at least one of the magnets can include a notch produced on an axial edge of the magnet.

The magnet is preferably sintered, the fixing portion of the magnet being produced by the sintering process.

The lug of the support is for example folded against the recessed or upstanding portion of the magnet, this support notably being produced by bending sheet metal.

The electrical machine of the invention can be adapted to operate at a maximum power between 500 W and 2000 W, for example.

BRIEF DESCRIPTION OF THE DRAWINGS

The machine will be better understood on reading the following detailed description of non-limiting embodiments of the invention and examining the appended drawings, in which:

FIG. 15 is a partial diagrammatic perspective view of a support conforming to one embodiment of the invention, when flat before rolling it up, FIG. 16 is a partial diagrammatic representation of a permanent magnet of one embodiment of the invention, to be disposed on the support from FIG. 15, FIG. 17 is a partial diagrammatic illustration of the support from FIG. 15, after rolling it up.

Figure 1:
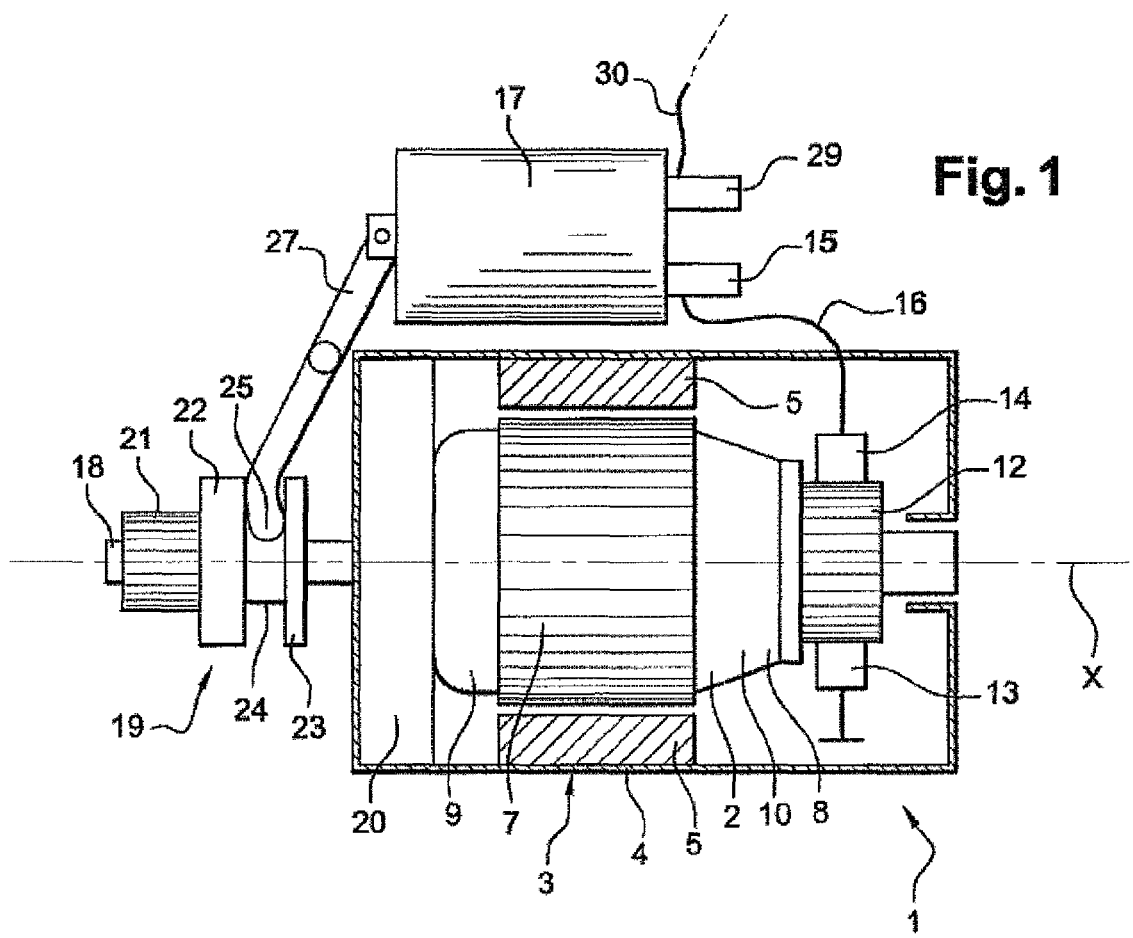
FIG. 1 is a partial diagrammatic representation of an automotive vehicle starter conforming to one embodiment of the invention.

There is represented very diagrammatically in FIG. 1 a starter 1 for an automotive vehicle internal combustion engine.

DETAILED DESCRIPTION OF PREFERRED EMBODIMENT

This DC starter 1 includes, on the one hand, a rotor 2, also called the armature, which can turn about an axis X, and, on the other hand, a stator 3, also called the field assembly, disposed around the rotor 2.

This stator 3 includes a yoke 4 carrying a permanently magnetised structure 5.

The rotor 2 includes a rotor body 7 and a winding 8 wound in notches of the rotor body 7.

In the example shown, the rotating electrical machine formed by the starter 1 is of the six-pole type.

The winding 8 forms, on respective opposite sides of the rotor body 7, a front bun-shaped assembly 9 and a rear bun-shaped assembly 10.

The rotor 2 is provided, at the rear, with a collector 12 comprising a plurality of contact parts electrically connected to the conductive elements of the winding 8, formed by wires in the example considered here.

A group of brushes 13 and 14 is provided for the supply of electrical power to the winding 8, one brush 13 being connected to the ground of the starter 1 and another brush 14 being connected to an electrical terminal 15 of a contactor 17 by a wire 16. There are four brushes, for example.

The brushes 13 and 14 rub on the collector 12 when the rotor 2 is rotating, energising the rotor 2 by switching the electrical current in sections of the rotor 2.

The starter 1 further includes a launcher assembly 19 slidably mounted on a drive shaft 18 and adapted to be driven in rotation about the axis X by the rotor 2.

A speed reducer assembly 20 is disposed between the rotor 2 and the drive shaft 18, in a manner known in the art.

Alternatively, the starter 1 can be of the 'Direct Drive' type, with no speed reducer.

The launcher assembly 19 includes a drive element formed by a pulley 21 and adapted to be engaged with a drive member of the internal combustion engine, not shown. This drive member is a belt, for example.

The pulley 21 can be replaced by a gear component, notably a toothed wheel, for driving the internal combustion engine.

The launcher assembly 19 further includes a freewheel 22 and a pulley washer 23 defining between them a groove 24 for receiving the end 25 of a fork 27.

This fork 27 is moulded from a plastic material, for example.

The fork 27 is actuated by the contactor 17 to move the launcher assembly 19 relative to the drive shaft 18, along the axis X, between a first position in which the launcher assembly 19 drives the internal combustion engine via the pulley 21 and a second position in which the launcher assembly 19 is disengaged from the internal combustion engine.

The contactor 17 includes, in addition to the terminal 15 connected to the brush 14, a terminal 29 connected by an electrical connection element, notably a wire 30, to an electrical power supply of the vehicle, notably a battery.

Figure 2:
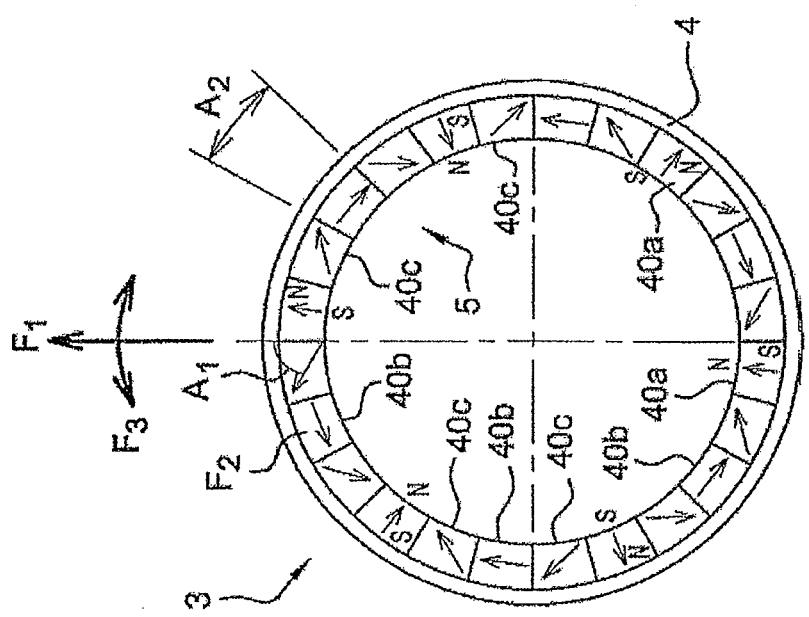

There is represented in FIG. 2 an example of a magnetised structure 5 conforming to a first embodiment of the invention.

In this embodiment, the magnetised structure 5 includes a number of permanent magnets, this number being equal to 24, strictly greater than the number of poles of the machine, which is equal to six.

Six of the 24 magnets have a radial magnetisation, parallel to the arrow F1 shown in FIG. 1.

These magnets 40a define the six poles of the machine, comprising three north poles N and three south poles S, facing the interior of the stator.

Between two consecutive magnets 40a are disposed three permanent magnets:
- a magnet 40b having a substantially orthoradial magnetisation direction F2, perpendicular to the direction F1, and
- on respective opposite sides of this magnet 40b, two magnets 40c having a magnetisation direction different from the radial and orthoradial directions.

In the embodiment considered here, the magnetisation direction is substantially uniform (or homogeneous) within each of the magnets 40a, 40b and 40c, and the magnet 40c forms with the radial direction F1 an angle A1 of approximately 45°.

Thus, the magnets 40a each define a sector of the magnetised structure 5 having a radial magnetisation direction (F1) of the stator 3, the magnets 40b each define a sector of the magnetised structure 5 having an orthoradial magnetisation direction (F2) of the stator 3, while the magnets 40c each define a sector of the magnetised structure 5 having a magnetisation direction different from the radial and orthoradial directions and having an aperture angle A2 of 15°, which corresponds to an electrical angle of 45°. As shown in FIG. 2, the north and south poles are disposed diametrically opposite to each other.

As can be seen, the magnets 40c have at all points, in particular in a central region along the circumference F3 of the stator 3, a magnetisation direction different from the radial direction F1 and the orthoradial direction F2.

The permanent magnets 40a-40c can have, as shown in FIG. 2, identical dimensions, so that the magnetised structure 5 has a thickness, measured in the radial direction F1, that is substantially constant around the circumference F3.

Between two magnetic poles N and S, the magnetisation direction of the magnetised structure 5 has four angular discontinuities, each of 45°.

The magnetisation then has a number of angular transitions between two poles N and S equal to three.

Between two consecutive magnetic poles N and S of the magnetised structure 5, the angle between the magnetisation direction of the structure and the radial direction F1 varies monotonously and discontinuously, with no angular turning back.

This concentrates the magnetic energy toward the airgap between the rotor 2 and the stator 3, corresponding to a significant reduction of the induction outside the magnetised structure 5 and a significant increase of the induction inside it.

In other words, the magnetic field generated by the magnetised structure outside the latter structure, measured in the absence of the yoke 4, is weaker than the field generated inside the magnetised structure 5, the magnetic energy outside the magnetised structure being notably 30% or 20% less than the magnetic energy inside the structure, the magnetic energy outside the structure, measured in the absence of the yoke, being notably negligible.

It has been found that a sufficient number of angular transitions, for example equal to three, ensures good mechanical stability of the magnets 40a-40c.

Figure 4A:
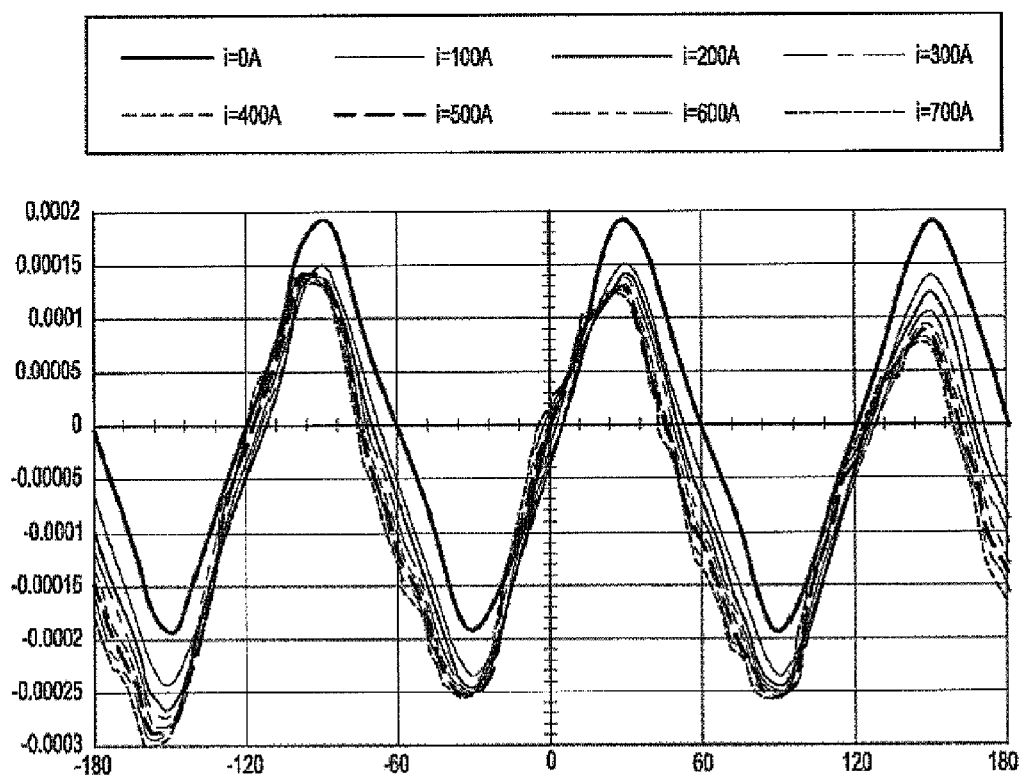
FIGS. 4a and 4b are two graphs representing the variation of the vector-potential as a function of the angle in the airgap, respectively according to the invention and according to the prior art.

FIG. 4a shows the variations of the vector-potential (in units Wb/m) as a function of the angle in the airgap for a number of values of the current I and a number of angular transitions equal to two. These variations were obtained by a finite element analysis.

It can be pointed out that the FIG. 4a graph takes the form of a standard representation in two dimensions readily showing any offset of the neutral magnetic line.

Note in FIG. 4a the virtual absence of displacement of the neutral magnetic line, which corresponds to the place at which the induction cancels out between consecutive poles, as the current I varies.

In other words, thanks to a number of angular transitions equal to or greater than two between consecutive magnetic poles, it is possible substantially to cancel the armature reaction, which is advantageous with regard to switching and electromagnetic coupling.

Figure 4B:
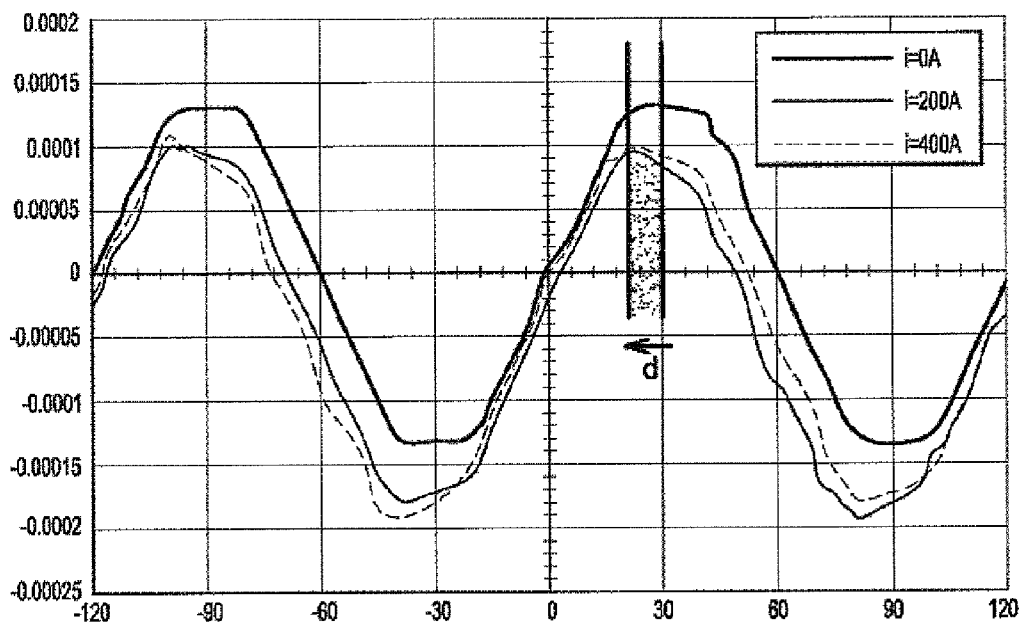

In contrast, in a situation shown in FIG. 4b in which the magnetised structure has no angular transitions, a displacement d of the neutral magnetic line is seen.

It has been found that the invention increases the torque and the power per unit mass.

In the embodiment considered here, the permanent magnets 40a-40c are anisotropic sintered ferrite magnets.

The magnets 40a-40c are magnetised outside the yoke 4, for example.

Alternatively, the permanent magnets 40a-40c can contain rare earth elements, for example produced in NdFeB.

In the embodiment that has just been described, the magnetised structure 5 includes a number of permanent magnets 40a-40c greater than the number of N and S poles of the machine.

Figure 3:
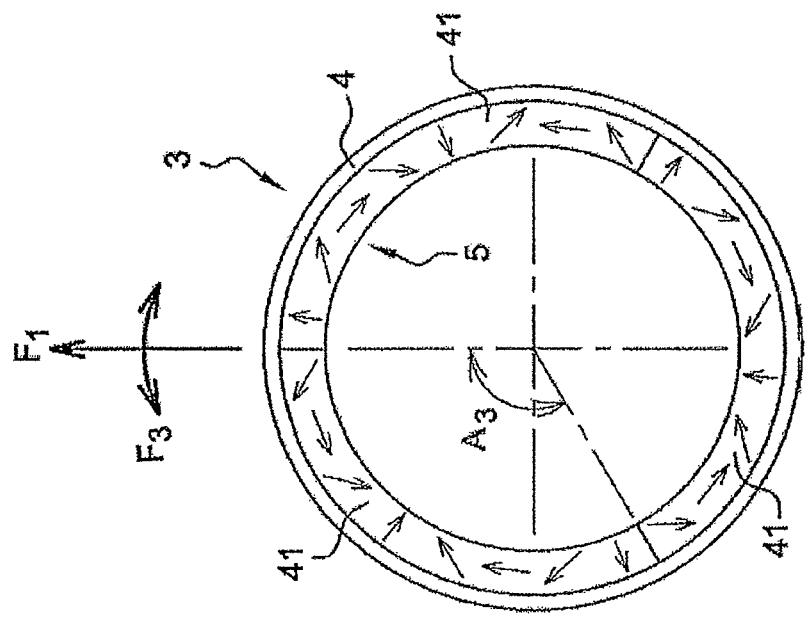
FIGS. 2 and 3 are partial diagrammatic representations of two magnetised structures of two embodiments of the invention.

Alternatively, as shown in FIG. 3, the structure 5 can include a number of permanent magnets less than the number of poles of the machine.

In the embodiments shown in FIG. 3, the structure 5 includes three permanent magnets 41 each of substantially part circular cylindrical shape with the angle A3 equal to 120°.

These magnets 41 are made of NdFeB, for example, with isotropic properties and a magnetisation direction which varies sinusoidally around the circumference F3 of the stator 3, along a magnet 41.

If required, the magnets 41 can be magnetised inside the yoke 4.

In the FIG. 3 embodiment, the number of angular transitions between two consecutive poles of the machine remains equal to three.

Of course, a number of angular transitions other than three remains within the scope of the present invention.

Figure 5:
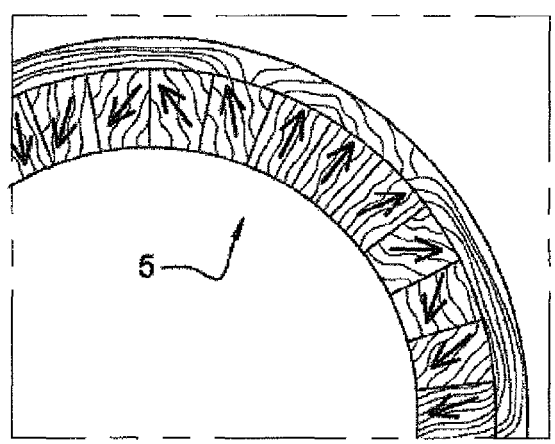
FIG. 5 is a partial diagrammatic illustration of another example of a magnetised structure of the invention.

Depending on the type of machine, this number can be equal to two or greater than or equal to four. For example, there is represented in FIG. 5 a magnetised structure 5 having six angular transitions between two consecutive magnetic poles.

The number of poles can be different from six, notably greater than six. The machine can have eight poles, for example.

Alternatively, the machine can have a number of poles less than six, for example two or four poles.

Different ways to fix permanent magnets in the stator in accordance with the invention are described next.

There are shown in FIGS. 6 to 9 various elements of a stator 50 conforming to one embodiment of the invention, for example for equipping the starter 1.

These elements include a support 51 and a plurality of permanent magnets 52 intended to be mounted on the support 51.

Figure 7:
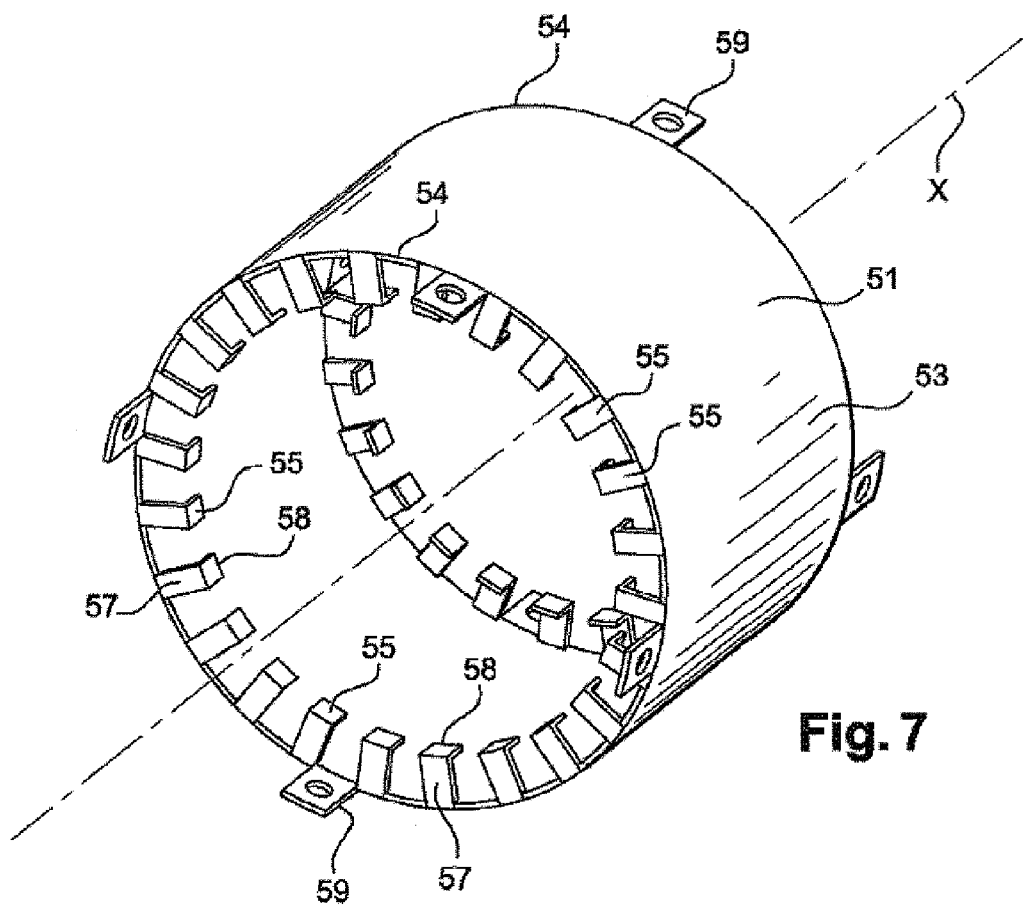
FIG. 7 is a partial diagrammatic representation of a magnet support according to FIG. 6, FIGS. 8 and 9 are partial diagrammatic illustrations of the placing of the support from FIG. 7, with the permanent magnets, in a yoke of the stator, in two assembly steps.

As shown in FIG. 7, the support 51 includes a cylindrical wall 53 of circular cross-section about an axis X.

This wall 53 has two opposite ends 54 to each of which is connected a plurality of lugs 55 projecting toward the interior of the wall 53.

There are 24 of these lugs 55 disposed regularly on the corresponding edge 54 at each end of the wall 51 to enable the fitting of 24 permanent magnets 52.

Each lug 55 has a first branch 57 perpendicular to the axis X extended at the end by a second branch 58 perpendicular to the first.

The support 51 is additionally provided with fixing members 59 adapted to button the support 51 to an interior surface 60 of a yoke 61.

Any appropriate means of fixing the support 51 to the yoke 61 can be used.

The support 51 can be produced by rolling sheet metal, for example.

That sheet metal can be made from a magnetic material, for example from steel.

Figure 6:
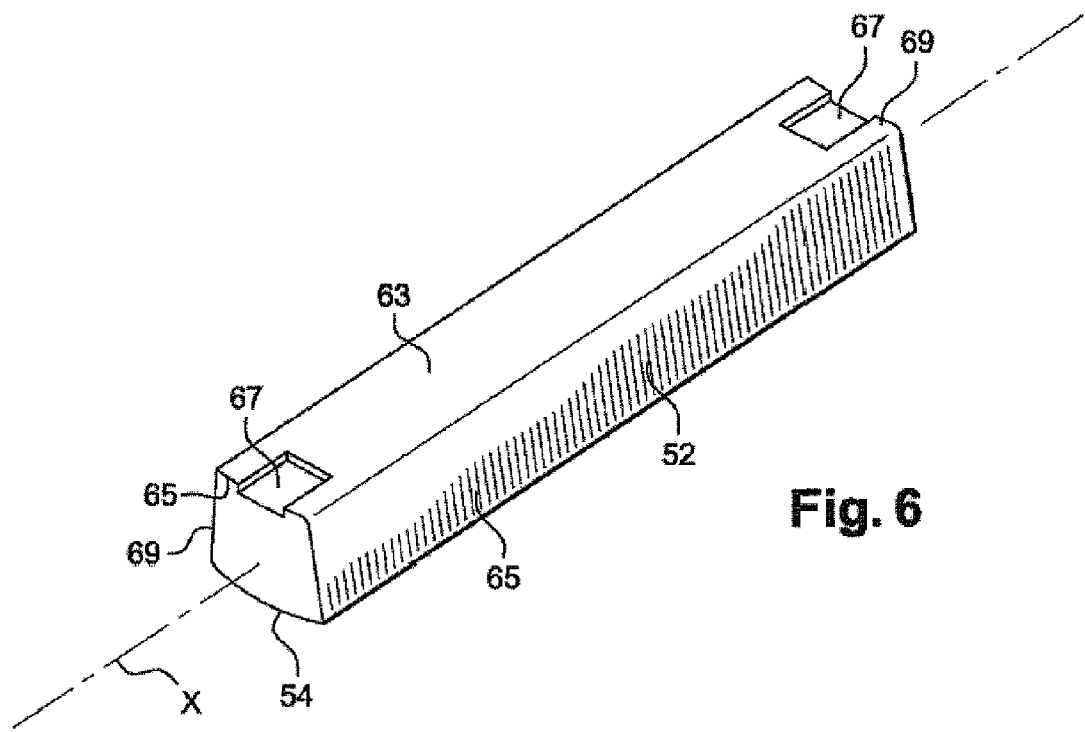
FIG. 6 is a partial diagrammatic representation of a permanent magnet conforming to one embodiment of the invention.

Each permanent magnet 52 has an interior face 63 and an exterior face 64, as can be seen in FIG. 6.

These faces 63 and 64 are defined by circular cylindrical portions so that when all the magnets 52 are placed on the support 51 the faces 62 and 64 of all the magnets form two substantially cylindrical surfaces.

Each magnet 52 also has two lateral faces 65 converging in the direction of the support 51.

Recessed fixing portions 67 are formed on each face 63 of the permanent magnets 52 with a view to securing these magnets onto the support 51 by means of the lugs 55.

In the embodiment considered here, each fixing portion 67 is formed by a notch opening onto an axial side 69 of the magnet 52.

The notch 67 has a substantially rectangular shape. Alternatively, the notch can have any other appropriate shape.

The dimensions and the shape of the notches 67 are selected so as to espouse the branch 58 of the lugs 55 when the magnets 52 are placed on the support 51.

Thus once the magnets are in place on the support 51, each branch 58 is engaged in a notch 67 of a magnet 52 and each branch 57 is pressed against an axial end of the magnet 52.

Figure 8:
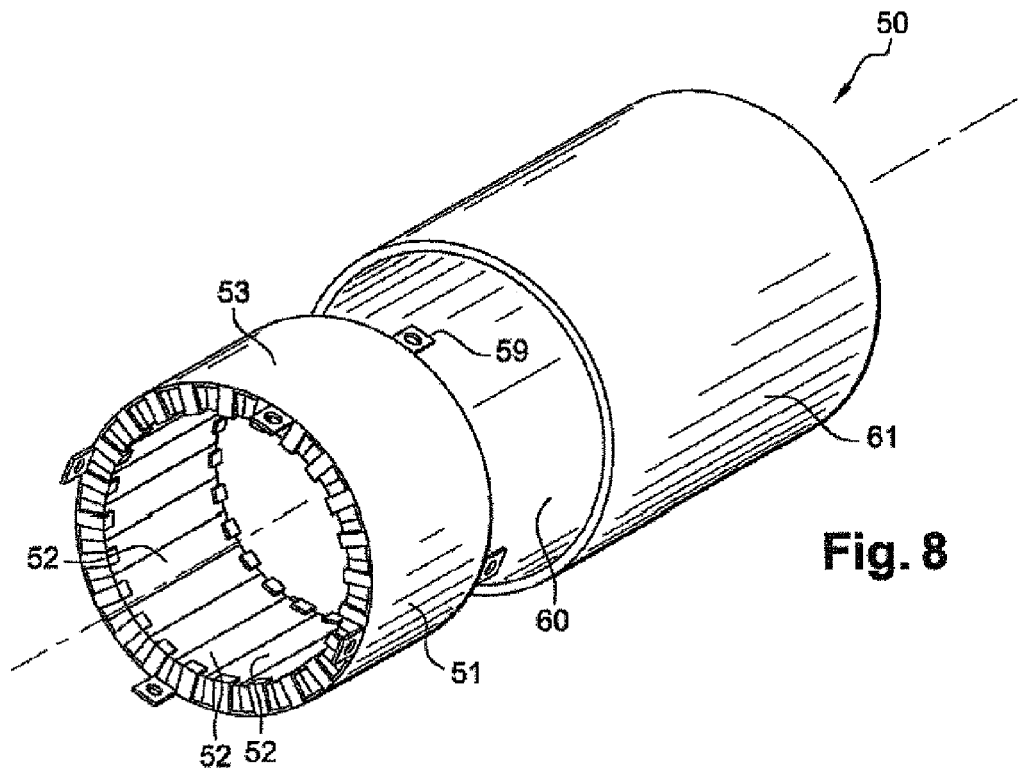
Figure 9:
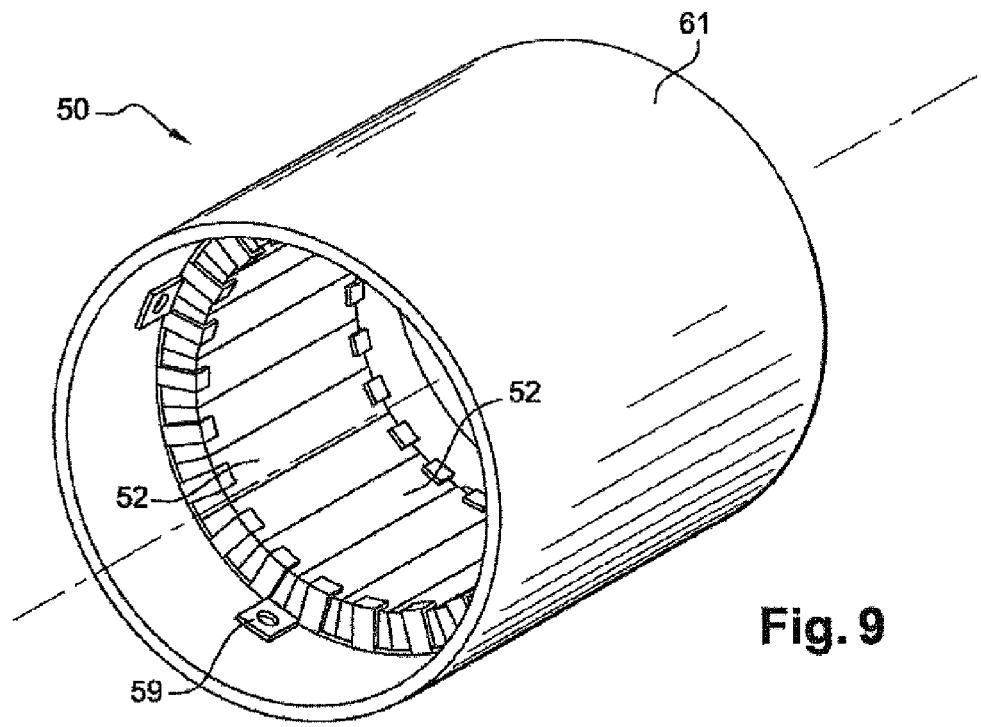

The magnets 52 are then retained in the radial and circumferential directions, as shown in FIG. 8.

These magnets 52 are clipped onto the support 51, by elastic deformation of the lugs 55.

Alternatively, the lugs 55 can be folded by bending them over the magnets 52, once the latter are in place on the support 51.

The depth of the notches 67 is substantially equal to the thickness of the branches 58 of the lugs 55 so that these branches 58 do not project into the airgap of the electrical machine.

The magnets 52 are sintered, for example and the notches 67 produced by this sintering process. Alternatively, these notches 67 can be produced by removal of material.

The solid cylindrical wall 53 can serve as a hoop inside the yoke 61 to reduce the magnetic saturation and, where appropriate, to reduce the thickness of the yoke 61.

In the embodiment considered here, the magnets 52 are placed on the support 51 in contact two by two. This avoids the presence of airgaps between lateral faces 65 of the magnets 52.

Of course, the number of permanent magnets 52 can be different from 24, depending on requirements.

Figure 10:
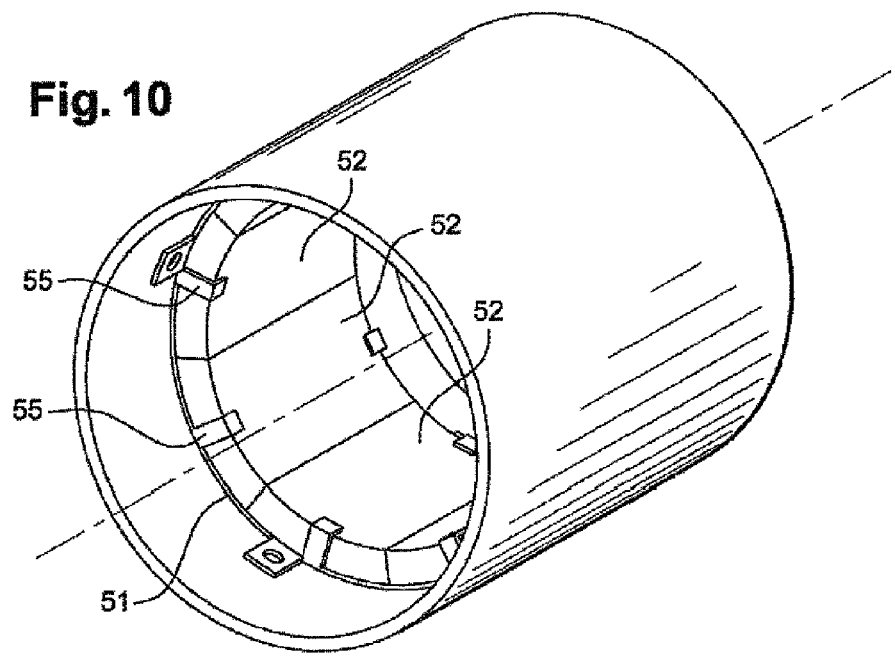
FIG. 10 is a partial diagrammatic representation of a stator of another embodiment of the invention.

For example, as shown in FIG. 10, the stator can include eight permanent magnets 52 fixed to a support 51 having eight pairs of lugs 55.

Notably when it is intended to use a relatively small number of magnets, for example fewer than eight, each magnet then having larger dimensions, it can be advantageous to retain each magnet using a greater number of lugs 55. For example, each magnet 55 can be retained by four lugs.

In the embodiment described above, the permanent magnets include notches.

It does not depart from the scope of the present invention to place on the support one or more permanent magnets having no recessed or upstanding fixing portion, notably no notches 67 as described above.

Figure 11:
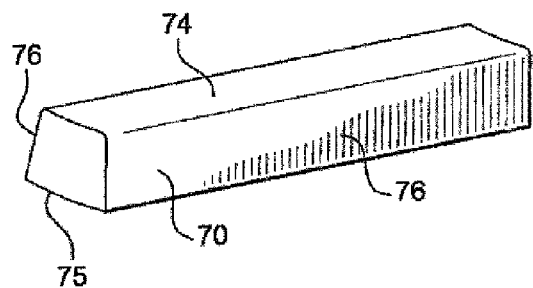
FIG. 11 is a partial diagrammatic perspective view of a permanent magnet of another embodiment of the invention.
Figure 12:
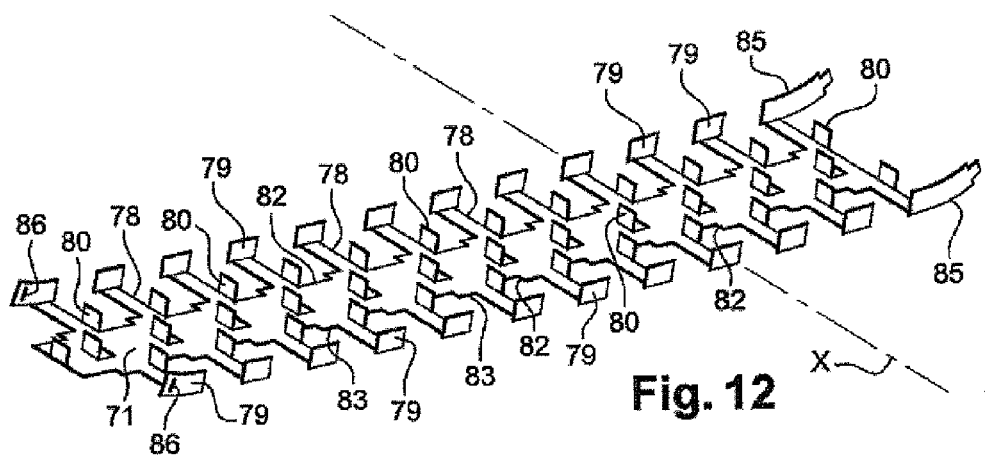
FIG. 12 is a partial diagrammatic representation of a magnet support according to FIG. 11.
Figure 13:
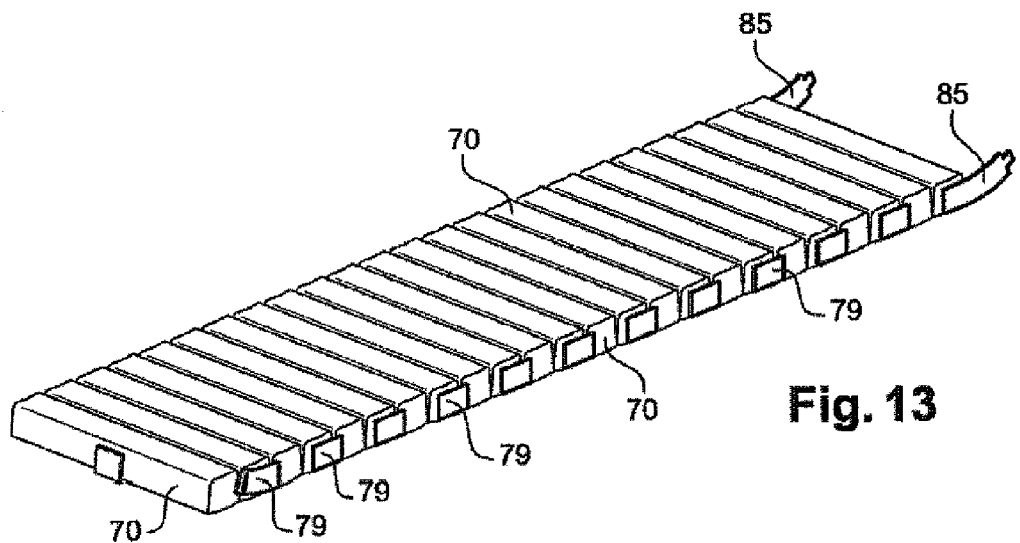
FIG. 13 is a partial diagrammatic illustration of the support from FIG. 12 with the permanent magnets fixed on top.

Such an embodiment of the invention is shown in FIGS. 11 to 13, with a plurality of identical permanent magnets 70, 24 magnets in the embodiment described, with no recessed or upstanding fixing portion, placed on a support 71.

Each magnet 70 has a radially interior face 74 and a radially exterior face 75 that are substantially portions of concentric cylinders, and lateral faces 76 converging radially inward.

The support 71 is initially flat to enable the placement of the permanent magnets 70, as shown in FIG. 12.

This support 71 includes a plurality of branches 78 parallel to the axis X each having at opposite ends lugs 79 for retaining the magnets 70.

The lugs 79 extend perpendicularly to the corresponding branch 78 and each has a substantially rectangular shape.

The support 71 is further provided with a plurality of tongues 80 perpendicular to the branches 78, each tongue being interleaved between two consecutive magnets 70, to retain the magnets circumferentially and radially.

Because of the presence of these tongues 80, a small airgap separates two consecutive magnets 70. The magnetised structure formed by the magnets 70 advantageously has no interrupted area, corresponding to the airgap, having an electrical angle aperture greater than 1°, notably 2° or 5°.

The number, dimensions and shape of the tongues 80 are chosen notably depending on the magnets 70 to be retained.

The support 71 includes narrower hinge portions 82 that facilitate rolling up the support 71 once the magnets 70 have been placed on top of it. The portions 82 alternate with the branches 78.

The support 71 is produced by cutting and bending a sheet metal strip, for example. This support 71 has cut-outs 83 leaving the exterior face 75 of the magnets 70 partially uncovered.

Arms 85 are provided at one end of the support 71 to keep it rolled up.

These arms 85 are for example engaged in notches 86 produced on lugs 79 at an opposite end of the support 71.

Alternatively, the support 71 can be adapted to remain rolled up merely by virtue of being placed in the yoke.

The example that has just been described, without departing from the scope of the invention, can be adapted for a number of magnets less than 24, for example 12, 8, 6, 4, 3 or 2.

In the embodiments described above, the support of the magnets is produced in one piece, notably in cut and bent sheet metal.

Figure 14:
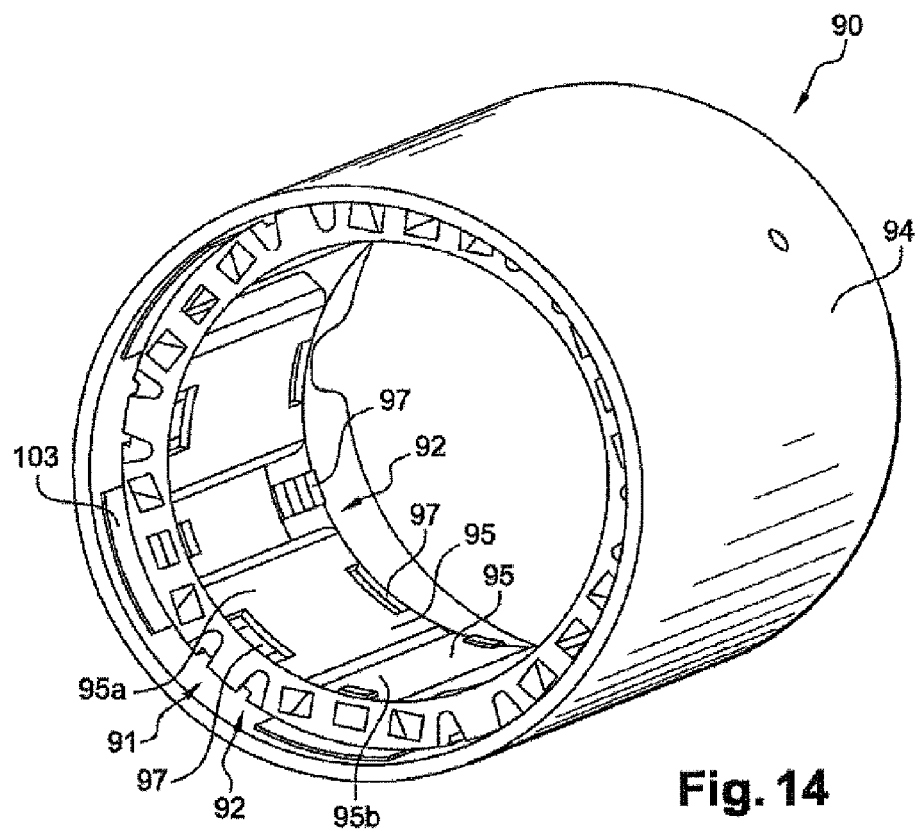
FIG. 14 is a partial diagrammatic representation of a stator conforming to another embodiment of the invention.

There are shown in FIGS. 14 to 16 different elements of a stator 90 conforming to one embodiment of the invention, including a support 91 formed by two separate parts 92.

Each part 92 is produced from a cut sheet metal strip folded from flat to confer on the part 92 an annular shape, as shown in FIG. 17.

Of course, the parts 92 can be produced in other materials.

The exterior diameter of the parts 91 is equal to the interior diameter of the yoke 94 in which the support 91 with permanent magnets 95 is fitted.

Each part 92 includes a plurality of lugs 97 for retaining the magnets 95. These lugs 97 have a substantially rectangular shape, for example.

Some of these lugs 97 extend radially and are each disposed between two adjacent magnets 95 disposed on a circumference of the corresponding part 92.

Other lugs 97, facing two by two, extend substantially along the circumference of the part 92 to retain the magnets 95 in a radial direction.

The magnets 95 each include two pairs of notches 99 of substantially rectangular shape, adapted to receive the lugs 97 of the parts 92 when the magnets 95 are mounted on the parts 92, the latter then being disposed at the opposite ends of the magnets 95.

Two of the notches 99 are situated on an exterior face 100 of the magnet and the other two notches 99 on an interior face 101. These notches 99 open onto the edges 102 at the ends of the magnet 95.

In the embodiment considered here, the magnets 95 are of two types. The magnets of a first group 95a are called main magnets, and have a radial magnetisation direction to define alternating north and south poles.

The magnets 95 of a second group 95b are auxiliary magnets, each disposed between two main magnets, these auxiliary magnets having a substantially orthoradial magnetisation direction.

Such an auxiliary magnet is represented in FIG. 14.

The presence of the auxiliary magnets reduces magnetic leakage.

The auxiliary magnets can have the same thickness measured in the radial direction as the main magnets.

Alternatively, the auxiliary magnets can have a thickness different from that of the main magnets.

It is possible to position the auxiliary magnets so as to leave a gap between these magnets and the yoke 94. In other words, the auxiliary magnets are not pressed against the yoke 94.

The space between the auxiliary magnets and the yoke is advantageously determined by the position of the lugs 97 that retain these magnets.

In a variant that is not shown, the magnets 95 can be arranged to have two or more angular transitions, as described above.

The parts 92 further include tongues 103 for buttoning these parts 92 to the yoke 94.

Other appropriate means for fixing the support 91 can be used.

The parts 92 of the support 91 and the magnets 95 can form an autonomous assembly before pressing into the yoke 94, which can simplify assembly operations.

In the embodiment shown, the electrical machine has six poles.

The lugs 97 that extend radially can possibly be dispensed with, and the magnets 95 retained against rotation by cooperation of the circumferential lugs 97 with the notches 99 in the magnets 95.

It is then possible to avoid the presence of airgaps between the main magnets and the auxiliary magnets, which can improve the efficiency of the electrical machine.

In the embodiments that have just been described, the parts 92 are produced by cutting and bending.

Figure 18:
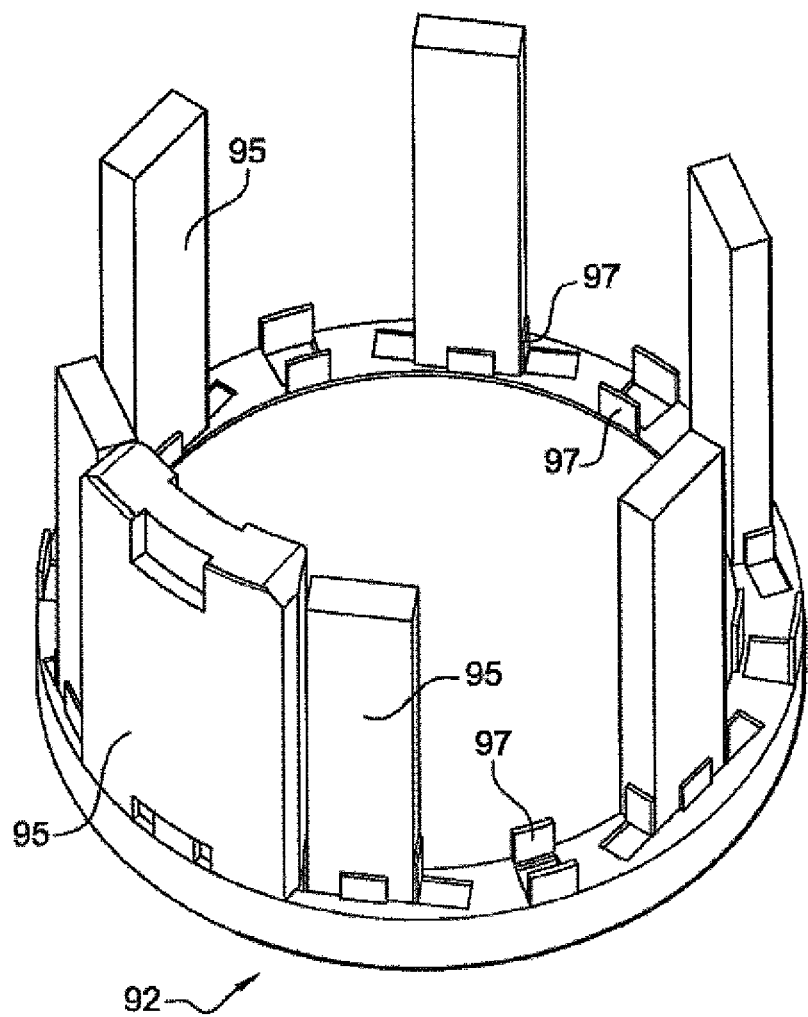
FIG. 18 is a partial diagrammatic representation of a support with permanent magnets placed on top, conforming to another embodiment of the invention.

Alternatively, the parts 92 of the support 91 can be produced by cutting and pressing, as shown in FIG. 18.

In the FIG. 18 embodiment, the support 92 carries alternating main magnets and auxiliary magnets 95.

Figure 20:
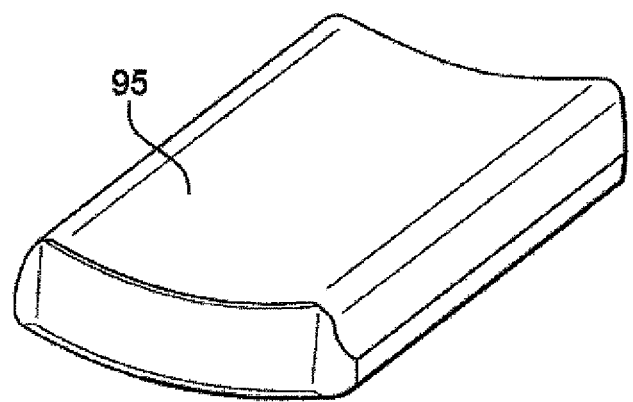
FIG. 20 is a partial diagrammatic representation of a permanent magnet to be disposed in the stator from FIG. 19.
Figure 19:
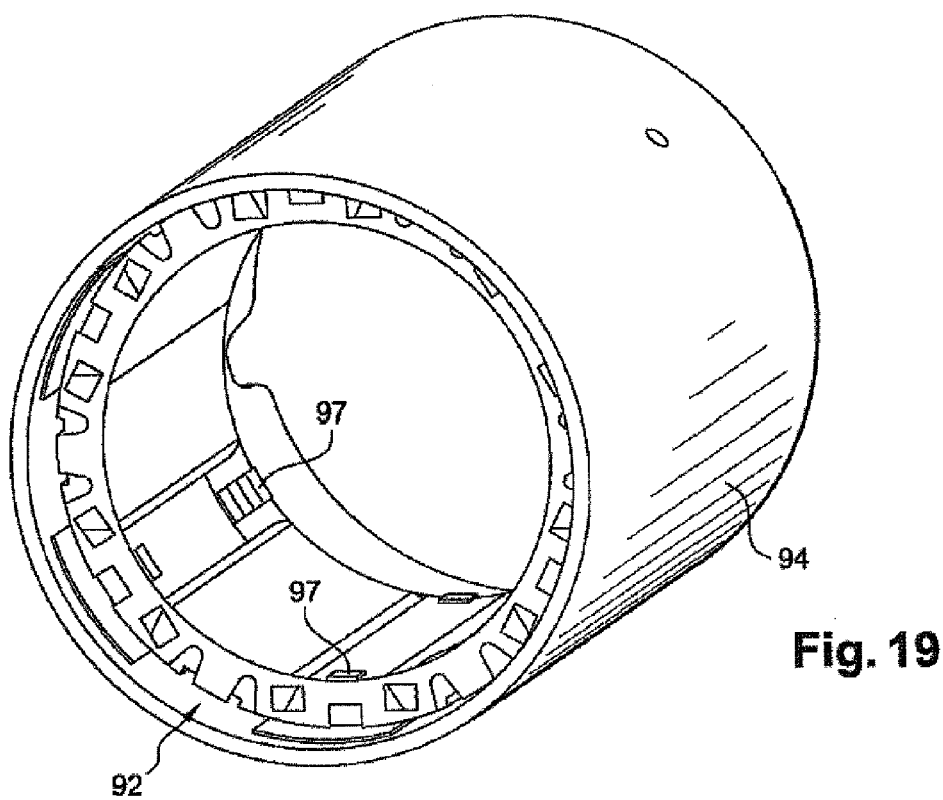
FIG. 19 is a partial diagrammatic illustration of a stator conforming to another embodiment of the invention.
Figure 21:
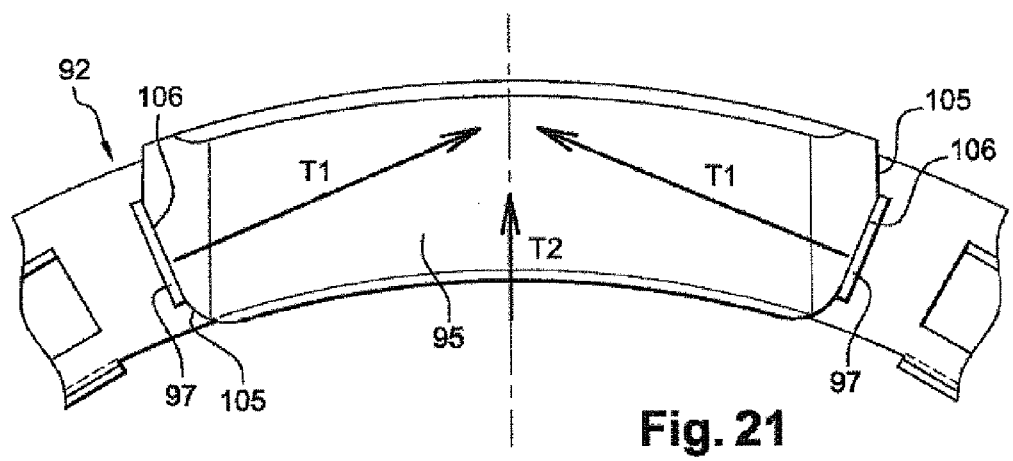
FIG. 21 is a partial diagrammatic illustration of the forces exerted on a permanent magnet of the stator from FIG. 19, FIGS. 22 and 23 are partial diagrammatic representations of two other examples of magnets with notches.

The main magnets 95 can have no notches 99, as shown in FIGS. 19 to 21.

In this case, each main magnet 95 is held against the yoke 94 not by means of circumferential lugs 97 but by virtue of the shape of the lateral faces 105 of the magnet 95.

As shown in FIG. 21, the faces 105 each have a plain portion 106 onto which is pressed a substantially radially oriented lug 97.

The portions 106 and the lugs 97 are arranged so that the lugs 97 exert on the sides of the magnet 95 two stresses T1 giving a resultant stress T2 in the radial direction tending to press the magnet 97 against the yoke.

As shown in FIG. 19, the support 92 includes lugs 97 for retaining the auxiliary magnets 95.

Of course, the invention is not limited to the embodiments that have just been described.

If it is required to avoid the presence on the magnet of recessed or upstanding fixing portions, notably notches, it is possible to provide on the support for the magnets lugs to be pressed only onto an interior face of the magnets, with no retaining lug pressed onto the exterior face of the magnets. The lugs of the support extend over a diameter less than the inscribed diameter of the set of magnets mounted on the support. This is to guarantee that the rotor can always be mounted correctly in the stator.

Moreover, at least one of the fixing portions of the permanent magnets can be formed, if required, by one or more beads projecting on an interior or exterior face of the magnet, the retaining lug of the support being adapted to cooperate with this bead or these beads to retain it radially and angularly.

In another embodiment of the invention, the aforementioned support 51 can be adapted to receive alternating main magnets and auxiliary magnets, with radial and orthoradial magnetisation directions, respectively.

The lugs for retaining the magnets on the support can have a shape other than rectangular, for example a trapezoidal shape.

Figure 22:
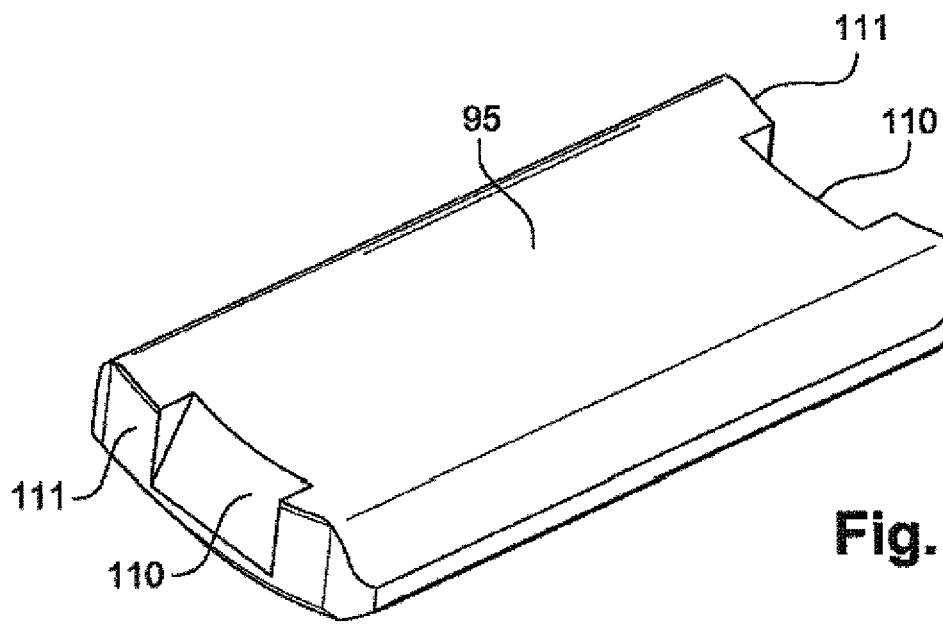
Figure 23:
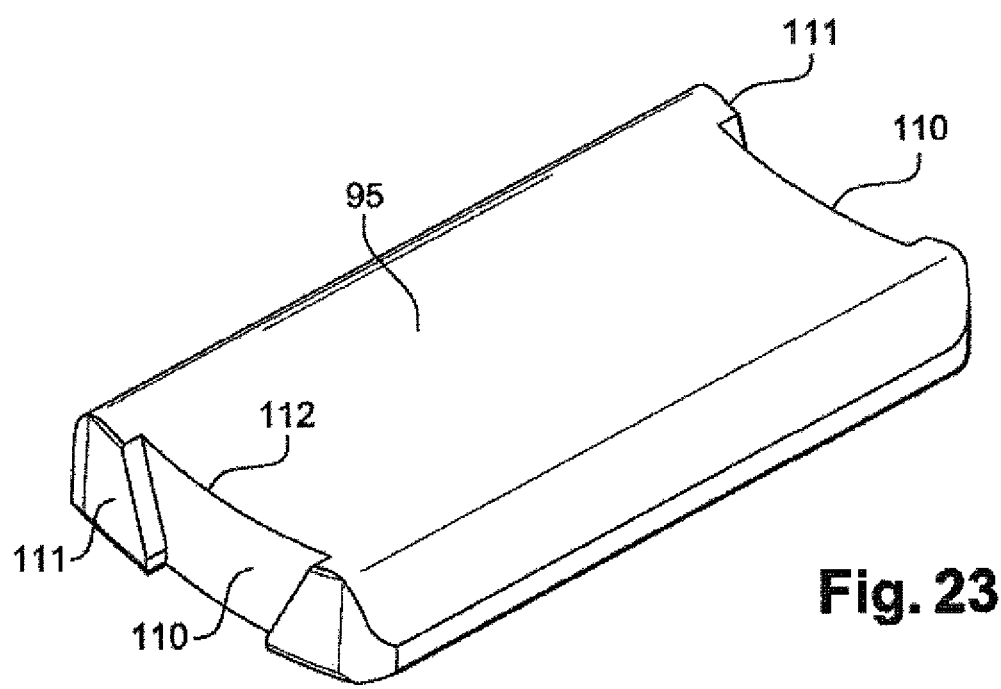

In the embodiments shown in FIGS. 22 and 23, the permanent magnets 95 include notches 110 each extending over an axial edge 111 of the magnet.

In the FIG. 22 embodiment, each notch 110 has a substantially rectangular shape, inclined with a slope selected so that a retaining lug engaged in this notch provides both radial and angular retention.

In the FIG. 23 embodiment, each notch 110 has a trapezoidal shape with the larger base 112 situated on an interior circumference, to provide both radial and angular retention.

In a variant of FIG. 6, it is possible to form notches on the lateral faces 65 of the magnets.

Figure 24:
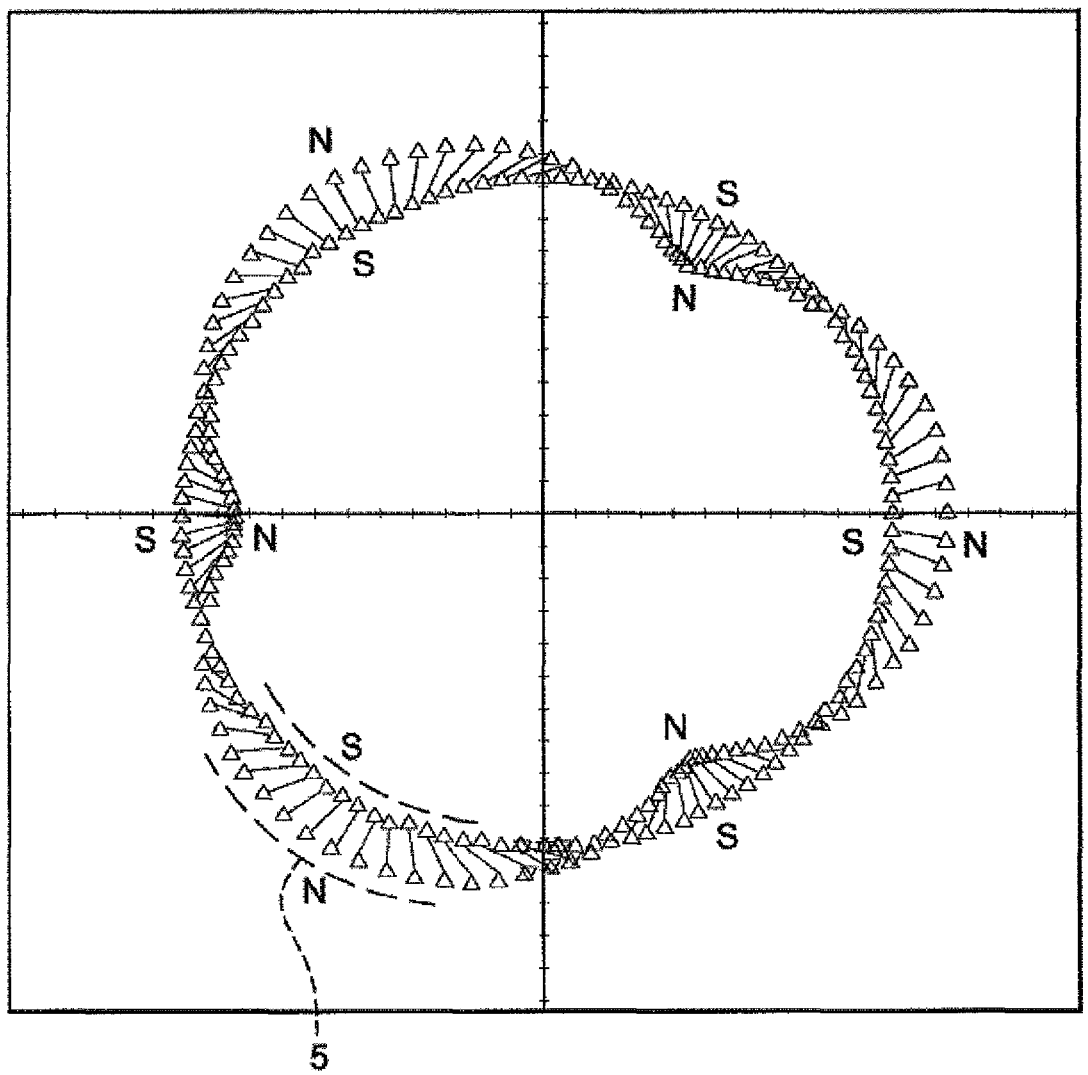
FIG. 24 illustrates the sinusoidal magnetisation within a magnetised structure of another embodiment of the invention.

There is shown in FIG. 24 a magnetised structure 5 conforming to another embodiment of the invention, having a magnetisation vector within the magnetised structure 5 that varies in a substantially sinusoidal manner around the whole of the circumference of the structure 5.

Alternatively, the magnetisation can have a sinusoidal profile over only some sectors of the structure 5, and not over the whole of its circumference.

In the embodiment considered here, the magnetised structure 5 has six N and S magnetic poles.

Figure 26:
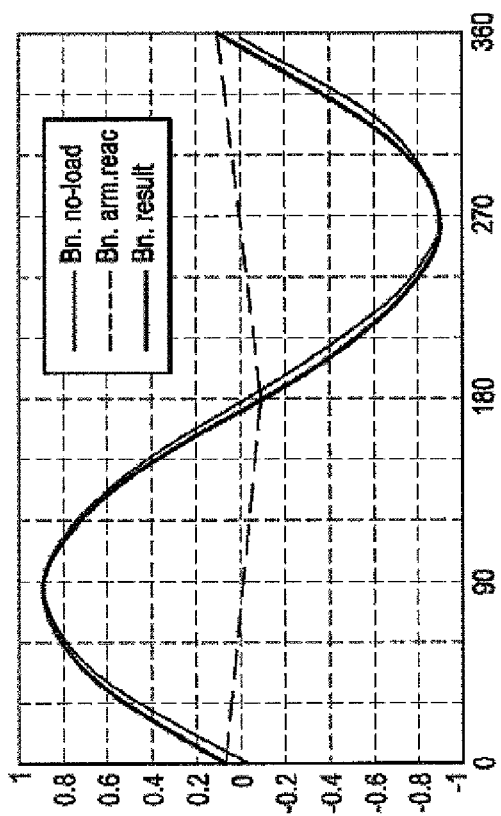
FIG. 26 is a diagrammatic representation of the variation of the induction generated by the magnetised structure with the magnetisation illustrated in FIG. 24 as a function of the angle.
Figure 27:
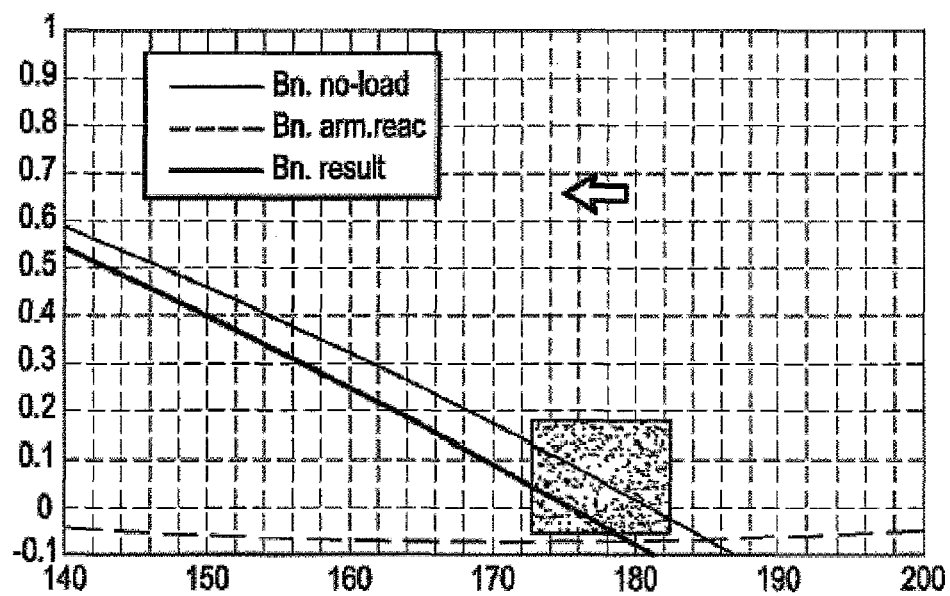
FIGS. 27 and 28 illustrate two types of angular offset of the neutral line for the magnetised structure with the magnetisation illustrated in FIG. 24.

FIG. 26 shows the variation, as a function of the angle, of the fields Bn.no-load (no-load induction), Bn.arm.reac (induction linked to the armature reaction) and Bn.result (resultant induction of Bn.no-load and Bn.arm.reac), for the magnetised structure 5 shown in FIG. 24. The induction Bn.result is substantially sinusoidal, and the angular offset of the neutral line (where the induction cancels out) is approximately 5°, as seen more clearly in FIG. 27.

Figure 25:
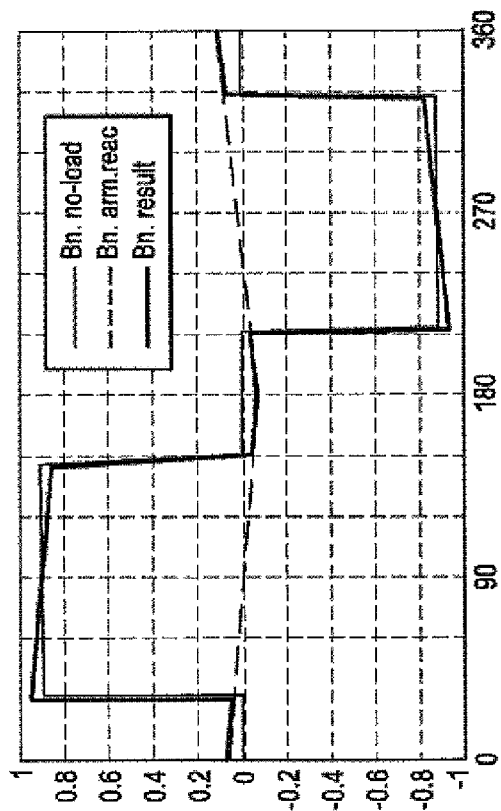
FIG. 25 is a diagrammatic representation of the variation of the induction generated by a prior art magnetised structure as a function of the angle.

By way of comparison, FIG. 25 shows the same fields for a magnetised structure with exclusively radial magnetisation. The induction Bn.result has a substantially trapezoidal profile, and the angular offset of the neutral line is approximately 30°, i.e. much greater than in the case of the invention.

In contrast to the case of exclusively radial magnetisation where, under load, an electromotive force is produced in the direction that degrades switching conditions (retarding effect of reversal of the current in the rotor, and therefore increased losses by electrical arcing), it is possible, thanks to the invention, to achieve satisfactory compensation of the slight deterioration of the switching conditions caused by a small angular offset.

The invention can introduce an additional angular offset so that the reversal of the current is accelerated, without the usual drawbacks of radial magnetisation.

Thanks to the invention, a more localised induction level is exploited to generate an electro-motive force accelerating the reversal of the current, according to a linear law associated with a local sinus profile, which facilitates robust design of the electrical machine, without the drawback of a high loss of torque because a smaller angular offset is sufficient for centred switching about the zero induction region.

Moreover, it is possible to impose a high angular offset to improve switching further because the magnetised structure 5 of the invention provides a 'torque reserve' usable depending on the requirements of the machine, the invention enabling an increase in the torque for the same quality and quantity of magnets.

Figure 28:
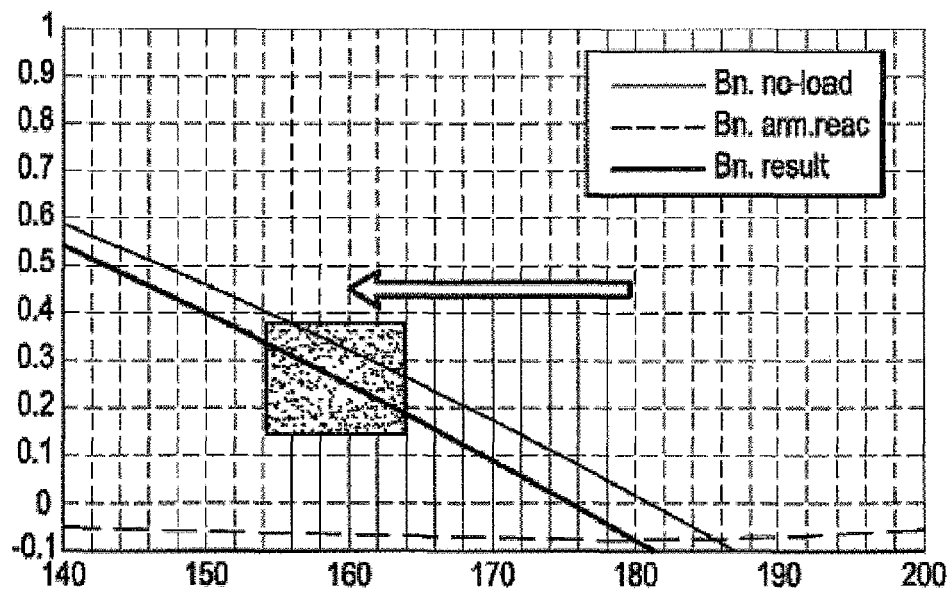

This angular offset can be chosen greater than 10 electrical degrees or 20 electrical degrees as in the embodiment described (see FIG. 28).

The invention further reduces iron losses in the armature because, with sinusoidal induction, the drawbacks linked to harmonics are reduced in magnitude.

Magnetic noise can also be reduced.

The invention claimed is:

1. A direct current rotating electrical machine for an automotive vehicle starter (1), the machine including:
    a stator (3) including a magnetised structure with permanent magnetisation, extending along a circumference of the stator and having north and south poles;
    a rotor (2); and
    a group of brushes (13, 14) adapted to supply electrical power to the rotor by switching the electrical current in sections of the rotor,
    the magnetised structure (5) of the stator comprising a plurality of magnets, each magnet including at least one first sector having a radial magnetisation direction (F1) of the stator, at least one second sector having an orthoradial magnetisation direction (F2) of the stator and at least one third sector having a magnetisation direction different from the radial direction (F1) and the orthoradial direction (F2) of the stator;
    each of the magnets having a radially interior face, a radially exterior face, and two lateral faces circumferentially spaced from each other;
    the magnetisation direction being substantially uniform within each of the sectors having the radial magnetisation direction (F1), the orthoradial magnetisation direction (F2) and the magnetisation direction different from the radial direction (F1) and the orthoradial direction (F2);
    the north and south poles being disposed diametrically opposite to each other.

2. The machine according to claim 1, wherein the sector with the magnetisation direction different from the radial and orthoradial directions subtends an electrical angle greater than 10°.

3. The machine according to claim 1, wherein the magnetisation direction in the sector with a magnetisation direction different from the radial and orthoradial directions forms with the orthoradial direction of the stator an angle between 5° and 85°.

4. The machine according to claim 1, wherein the magnetisation in the magnetised structure (5) has a direction not parallel to itself around one turn of the stator.

5. The machine according to claim 1, wherein the direction of the magnetisation in the magnetised structure relative to a radial direction varies with no angular discontinuity greater than 45° around the circumference of the stator.

6. The machine according to claim 1, wherein the magnetised structure (5) of the stator is disposed against a yoke (4) and has a magnetisation chosen so that the magnetic field generated by the magnetised structure outside the magnetised structure, measured in the absence of the yoke, is lower than the field generated inside the magnetised structure, the magnetic energy outside the magnetised structure being less than 20% of the magnetic energy inside the magnetised structure.

7. The machine according to claim 1, wherein, between two consecutive magnetic poles (N; S) of the magnetised structure, the angle between the magnetisation direction of the magnetised structure and the radial direction of the stator varies monotonously from one magnetic pole to the next magnetic pole.

8. The machine according to claim 1, wherein the magnetised structure has a thickness, measured in a radial direction of the magnetised structure that is substantially constant circumferentially in the direction from one magnetic pole of the magnetised structure to the next pole.

9. The machine according to claim 1, wherein the magnetised structure (5) has no interrupted area having an electrical angle aperture greater than 1°.

10. The machine according to claim 1, further comprising at least six poles.

11. The machine according to claim 1, wherein the magnetised structure includes a number of permanent magnets equal to half the number of poles of the machine.

12. The machine according to claim 1, wherein the magnetised structure comprises six first sectors that correspond to six poles and each magnet includes two first sectors, two second sectors, and four third sectors.

13. The machine according to claim 1, wherein each of the at least one first, second and third sectors have substantially identical dimensions.

14. The machine according to claim 1, wherein one of the lateral faces of a first magnet is associated with a third sector and the lateral face of the first magnet is directly adjacent to one of the lateral faces of at least a second magnet associated with a first sector.

15. The machine according to claim 1, wherein each magnet has a circular cylindrical shape with an angle equal to approximately 120°.

16. The machine according to claim 1, wherein a magnetic field generated by the magnetised structure is in the range of 20-30% weaker at the radially exterior faces of the magnets than at the radially interior faces.

17. A direct current rotating electrical machine for an automotive vehicle starter (1), the machine including:
- a stator (3) including a magnetised structure with permanent magnetisation, extending along a circumference of the stator;
- a rotor (2); and
- a group of brushes (13, 14) adapted to supply electrical power to the rotor by switching the electrical current in sections of the rotor;
- the magnetised structure (5) of the stator including at least one sector having a radial magnetisation direction (F1) of the stator, at least one sector having an orthoradial magnetisation direction (F2) of the stator and at least one sector having a magnetisation direction different from the radial direction (F1) and the orthoradial direction (F2) of the stator
- the magnetised structure including a number of permanent magnets (41) equal to half the number of poles of the machine.

* * * * *